(12) United States Patent
Bliwas

(10) Patent No.: US 11,386,513 B2
(45) Date of Patent: Jul. 12, 2022

(54) COMPUTER ASSISTED BENEFITS APPLICATION

(71) Applicant: Aviv Sarah Bliwas, Boiling Springs, PA (US)

(72) Inventor: Aviv Sarah Bliwas, Boiling Springs, PA (US)

( * ) Notice: Subject to any disclaimer, the term of this patent is extended or adjusted under 35 U.S.C. 154(b) by 145 days.

(21) Appl. No.: 15/669,004

(22) Filed: Aug. 4, 2017

(65) Prior Publication Data

US 2019/0043146 A1    Feb. 7, 2019

(51) Int. Cl.
| | |
|---|---|
| *G06Q 50/26* | (2012.01) |
| *G06Q 40/08* | (2012.01) |
| *G06F 40/174* | (2020.01) |
| *G06F 16/93* | (2019.01) |
| *G06V 30/40* | (2022.01) |
| *G06V 30/413* | (2022.01) |
| *G06V 30/416* | (2022.01) |
| *G06V 30/418* | (2022.01) |

(52) U.S. Cl.
CPC .......... *G06Q 50/26* (2013.01); *G06F 40/174* (2020.01); *G06Q 40/08* (2013.01); *G06V 30/40* (2022.01); *G06V 30/413* (2022.01); *G06V 30/416* (2022.01); *G06V 30/418* (2022.01); *G06F 16/93* (2019.01)

(58) Field of Classification Search
CPC .. G06F 17/243; G06F 17/30011; G06F 16/93; G06F 40/174; G06Q 50/26
See application file for complete search history.

(56) References Cited

U.S. PATENT DOCUMENTS

| | | | | |
|---|---|---|---|---|
| 9,117,118 | B1* | 8/2015 | Lewis | H04N 1/00761 |
| 9,672,487 | B1* | 6/2017 | Garcia | G06Q 10/0633 |
| 2009/0138277 | A1* | 5/2009 | Warren | G06F 19/328 |
| | | | | 705/2 |
| 2009/0228380 | A1* | 9/2009 | Evanitsky | G06Q 40/02 |
| | | | | 705/31 |
| 2010/0161460 | A1* | 6/2010 | Vroom | G06Q 40/02 |
| | | | | 705/31 |

(Continued)

*Primary Examiner* — Stephen S Hong
*Assistant Examiner* — Nicholas Hasty
(74) *Attorney, Agent, or Firm* — Gabriel & Co; Andrew M Gabriel

(57) ABSTRACT

One aspect provides a method, including: executing a benefits application workflow using a computing device; receiving, at an input device, user input data for the benefits application workflow; indicating, based at least in part on the user input data, a requirement for supporting documentation; receiving at the computing device an image comprising user supplied documentation; classifying the user supplied documentation, using a processor of the computing device, by: processing the image to identify one or more elements of a document contained within the image; comparing the one or more elements to a datastore of known elements; and determining a document type based on the comparing; providing, using an output device, an indication of the document type and a request for user confirmation thereof; and thereafter confirming the document type and automatically importing data into at least a portion of the benefits application workflow based on the document type. Other aspects are described and claimed.

15 Claims, 8 Drawing Sheets

(56) References Cited

U.S. PATENT DOCUMENTS

| | | | |
|---|---|---|---|
| 2012/0215669 A1* | 8/2012 | Lieberman | G06Q 40/123 705/31 |
| 2014/0244456 A1* | 8/2014 | Huang | G06Q 40/123 705/31 |
| 2016/0063445 A1* | 3/2016 | Feinschreiber | G06Q 40/06 705/4 |
| 2016/0239931 A1* | 8/2016 | Sabri | G06Q 50/26 |

* cited by examiner

FIG. 1

| D. Life Insurance | None ☐ ← 102a | | | |
|---|---|---|---|---|
| Company Name | Policy Number | Face Value | Current Cash Value | Who Owns The Policy? |
| Example Life Insurance Company | 123456789 | $100,000.00 | $10,000.00 | Applicant A |

E. Automobiles, Recreational Vehicles, Trucks, Motorcycles    None ☒ ← 102b

| Owner(s) Name | Year | Make | Model | Licensed? | Plate Number | Account |
|---|---|---|---|---|---|---|

F. Bank Accounts (Checking, Savings, IRA, etc.) List all accounts that include applicant's and/or spouse's name and money    None ☐ ← 102c

| Bank Name/Branch | Account Type | Account Number | Current Balance | Name(s) on Account/Owner |
|---|---|---|---|---|
| Example Bank/City Center | 001 | 213456789 | $1234.00 | Applicant A |
| | 001 | 213456759 | $1334.00 | Applicant A |

G. Stocks, Bonds (including U.S. Savings Bonds), Trusts, Mutual Funds, cash on hand, etc.    None ☒ ← 102d

| Name on Investment | Type Account | Account Number | Current Account Value | Name(s) on Account/Owner |
|---|---|---|---|---|

FIG. 1

COMPUTER ASSISTED BENEFITS APPLICATION

FIELD

The subject matter described herein relates to document creation services that automate aspects of paper-based benefits applications. Specifically, the subject matter described herein relates to techniques for incorporating electronic data for automated or semi-automated generation of legacy paper-based benefits applications.

BACKGROUND

Benefits applications are required for obtaining many different benefits, e.g., Medicaid. These applications originated as paper applications that were filled out manually and submitted by an applicant to a reviewing organization, e.g., a state or federal government organization, in order to apply for benefits. These benefits applications are complex, for example requiring the submission of different document types to establish the validity of entries on the paper-based application.

In an effort to facilitate or streamline the completion of benefits applications, and the requisite compiling and submission of supporting documentation, web-based applications were developed, which complement the traditional paper-based applications (which are still utilized). For example, there are currently two options to submit a Medicaid application for the Commonwealth of Pennsylvania, i.e., a paper-based application that is filled out and mailed in (along with any supporting documentation), or a web-based application that is filled out using an Internet browser via an online portal (with supporting documentation being uploaded thereto), which is run by the state.

BRIEF SUMMARY

In summary, one embodiment provides a method, comprising: executing a benefits application workflow using a computing device; receiving, from an input device, user input data for the benefits application workflow; indicating, based at least in part on the user input data, a requirement for supporting documentation; receiving at the computing device an image comprising user supplied documentation; classifying the user supplied documentation, using a processor of the computing device, by: processing the image to identify one or more elements of a document contained within the image; comparing the one or more elements to a datastore of known elements; and determining a document type based on the comparing; providing, using an output device, an indication of the document type and a request for user confirmation thereof; and thereafter confirming the document type and automatically importing data into at least a portion of the benefits application workflow based on the document type.

Another embodiment provides a system, comprising: an input device; an output device; a processor; and a memory device operatively coupled to the input device, the output device, and the processor; the memory comprising code executable by the processor, the code comprising: code that executes a benefits application workflow; code that receives, from the input device, user input data for the benefits application workflow; code that indicates, based at least in part on the user input data, a requirement for supporting documentation; code that receives an image comprising user supplied documentation; code that classifies the user supplied documentation by: processing the image to identify one or more elements of a document contained within the image; comparing the one or more elements to a datastore of known elements; and determining a document type based on the comparing; code that provides, using the output device, an indication of the document type and a request for user confirmation thereof; and code that thereafter confirms the document type and automatically imports data into at least a portion of the benefits application workflow based on the document type.

A further aspect provides a product, comprising: a non-transitory storage device that stores code that is executable by a processor, the code comprising: code that executes a benefits application workflow; code that receives, from an input device, user input data for the benefits application workflow; code that indicates, based at least in part on the user input data, a requirement for supporting documentation; code that receives an image comprising user supplied documentation; code that classifies the user supplied documentation by: processing the image to identify one or more elements of a document contained within the image; comparing the one or more elements to a datastore of known elements; and determining a document type based on the comparing; code that provides, using an output device, an indication of the document type and a request for user confirmation thereof; and code that thereafter confirms the document type and automatically imports data into at least a portion of the benefits application workflow based on the document type.

The foregoing is a summary and is not intended to be in any way limiting. For a better understanding of the example embodiments, reference can be made to the detailed description and the drawings. The scope of the invention is defined by the claims.

BRIEF DESCRIPTION OF THE SEVERAL VIEWS OF THE DRAWINGS

FIG. 1 illustrates an example benefits application part and data entries therein.

DETAILED DESCRIPTION

Figure 2:
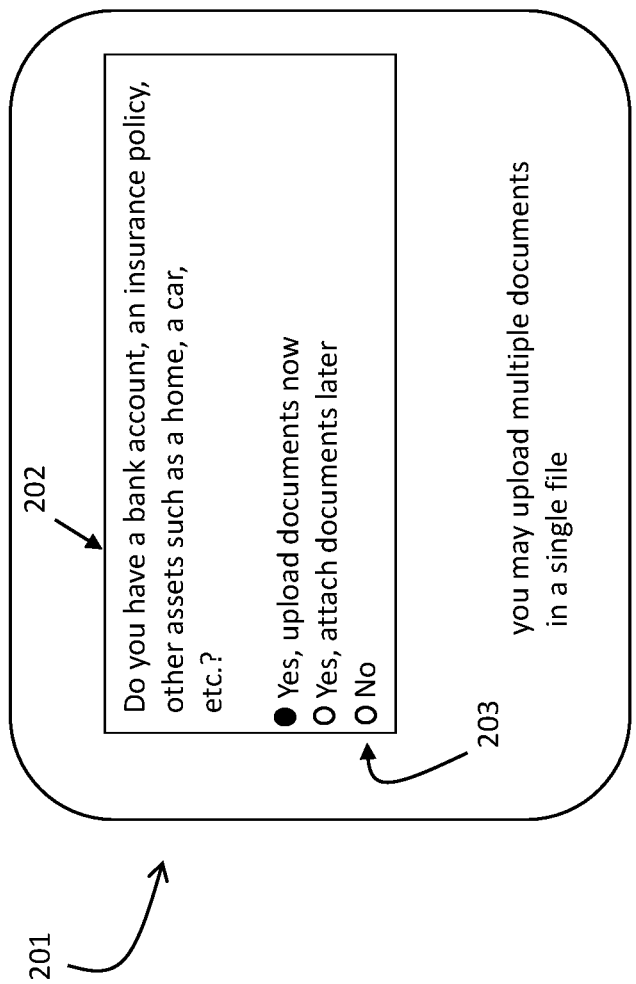
FIG. 2 illustrates an example user interface for a benefits application workflow.

It will be readily understood that the components of the embodiments, as generally described and illustrated in the figures herein, may be arranged and designed in a wide variety of ways in addition to the examples described herein. The detailed description uses examples, represented in the figures, but these examples are not intended to limit the scope of the claims.

Reference throughout this specification to "embodiment(s)" (or the like) means that a particular described feature or characteristic is included in that example. This particular feature or characteristic may or may not be claimed. This particular feature may or may not be relevant to other embodiments. For the purpose of this detailed description, each example might be separable from or combined with another example, i.e., one example is not necessarily relevant to other examples.

Therefore, the described features or characteristics of the examples generally may be combined in any suitable manner, although this is not required. In the detailed description, numerous specific details are provided to give a thorough understanding of example embodiments. One skilled in the relevant art will recognize, however, that the claims can be practiced without one or more of the specific details found in the detailed description, or the claims can be practiced with other methods, components, etc. In other instances, well-known details are not shown or described in detail to avoid obfuscation.

As described above, certain efforts have been made to help simplify the process of filling out a benefits application, e.g., provision of an online or web-based application tool. Unfortunately, while these online tools permit some automation (e.g., presentation of various screens for data input in sequence, application part checking, document upload, etc.), they remain difficult to use and put up a lot of barriers to filling out the application completely and correctly. For example, often these online portals experience significant downtime, are error prone and generally confusing to the applicants. Further, most applicants lack the expertise to notice if the online portal is generating an error or omission that will render the benefits application defective. Further, as above, the benefits applications are often complex and confusing, e.g., using codes rather than simple names, such as requiring a code entry of "001" for a checking account.

Accordingly, an embodiment provides a convenient benefits application workflow that facilitates generation of a paper-based benefits application. In an embodiment, the user is presented with easy to understand user interface elements that guide the user through the benefits application process. For example, depending on variable user input possibilities, an embodiment prompts the user for further information, e.g., uploading of supporting documentation. Further, an embodiment automatically analyses user input, such as an uploaded document or file, e.g., using image analysis techniques such as optical character recognition (OCR), pattern or template based analyses, and/or computer vision techniques, in order to determine the type and/or content contained within the user-provided input and its relevance to certain application part(s).

An embodiment also automates certain parts of the benefits application process. For example, in addition to permitting certain fields (e.g., name, date, etc.) to be automatically replicated or populated throughout the document, an embodiment includes rule sets that are updated to match the relevant requirements of the governing body issuing the benefits. For example, an embodiment may include a rule set that includes a rule regarding individual retirement account (IRA) spousal exemption or the like, which facilitates predictions or projections that are provided automatically to the user. Thus, a user is able to be apprised by an embodiment that it is predicted that benefits will be available, provided with a projection of the amount of money that a spouse may keep, etc.

The description now turns to the figures. The illustrated example embodiments will be best understood by reference to the figures. The following description is intended only by way of example and simply illustrates certain selected example embodiments.

Referring now to FIG. 1, an example benefits application part 101 having data entries therein is illustrated. In FIG. 1, by way of non-limiting example, a part 101 of a benefits application for Medicaid in the Commonwealth of Pennsylvania is illustrated. This part 101 includes categories, e.g., "D. Life Insurance," "E. Automobiles, Recreational Vehicles, Trucks, Motorcycles," "F. Bank Accounts (Checking, Savings, IRA, etc.)" and "G. Stocks, Bonds (including U.S. Savings Bonds), Trusts, Mutual Funds, cash on hand, etc." Each category, e.g., "D. Life Insurance," includes areas 103a-103d or fields into which data entries are made, e.g., "Example Life Insurance Company" 108a is entered into field 103a to indicate the name of an applicant's life insurance company. As illustrated, other fields are used to enter further data, e.g., a policy number, a face value, a current cash value, and the owner of the policy. The other categories likewise include fields (103b-103d) that are to be filled in by the applicant as applicable. In the example benefits application part 101 of FIG. 1, the category "F. Bank Accounts (Checking, Savings, IRA, etc.)" is also filled in with information for a checking accounts owned by the applicant.

As opposed to using an online tool to manually key in these data entries, or using a pen to fill out a paper-based benefits application, an embodiment provides a benefits application workflow program that presents the user, e.g., on a touch screen or other computer display, a series of graphical user interfaces that guide the user through the application process, automating certain parts for the user.

For example, an embodiment includes rule sets that assist an applicant in filling out a benefits application. As illustrated in FIG. 1, the benefits application part 101, which may be generated as a graphic on a touch screen or other display device, includes an element 102a that triggers a rule if selected. By way of specific example, if a user chooses to click on or interface with element 102a, the underlying field(s) may be greyed out or blocked from accepting input. This prevents the user from filling in inconsistent data entries. In contrast, if element 102a is not checked, as in the example of FIG. 1, the fields 103a remain available for data entry, e.g., data entry 108a may be included therein.

Likewise, other functional elements 102b-102d are included in the application part 101 and linked to function rules. By way of example, elements 102b and 102d are checked, and thus the fields 103b and 103d may be excluded from receiving data input. Alternatively, different or additional rules may be utilized. For example, if element 102a remains unchecked, a user may be prompted to provide data entries for field 103a prior to being permitted to proceed to another part of the application, the user may be provided with a warning regarding missing or inconsistent data entries, etc.

As those having skilled in the relevant art will appreciate, data entry of this type is often confusing to many users and even with basic rules such as those mentioned above, data entry is cumbersome. For example, a given user may not know what assets they have to start providing data entries for in application part 101. Therefore, an embodiment provides rules to assist users in evaluating their assets and ultimately filling out a benefits application.

By way of non-limiting example, illustrated in FIG. 2 is an example user interface for a benefits application workflow that is used to assist a user in generating a complete and correct paper-based benefits application. As illustrated in FIG. 2, a graphical user interface 201 is provided to the user, e.g., on a touch screen or other display device, requesting user input. In this example, the interface 201 provides a message 202 asking the user if certain assets relevant to filling out application part 101 are available.

In the example of FIG. 2, a user is queried regarding available assets in a general manner. That is, the user is presented with a message 202 asking if there are any available assets such as a bank account, an insurance policy, or other assets such as a home, a car or the like. The interface 201 includes selection options 203, e.g., radio buttons, that permit a user to indicate if relevant assets are available. Further, an option is provided within the selection options for uploading documents related to these assets. It will be understood that other types of data capture might be employed. For example, if a user is operating the workflow on a tablet with a touch screen interface, the selection options 203 might include an image capture option ("take a picture of my document(s)"), rather than an upload option, etc. As illustrated in FIG. 2, an embodiment permits a user to upload one or more documents that can be analyzed to determine their relevance to one or more application parts, e.g., part 101.

Figure 3:
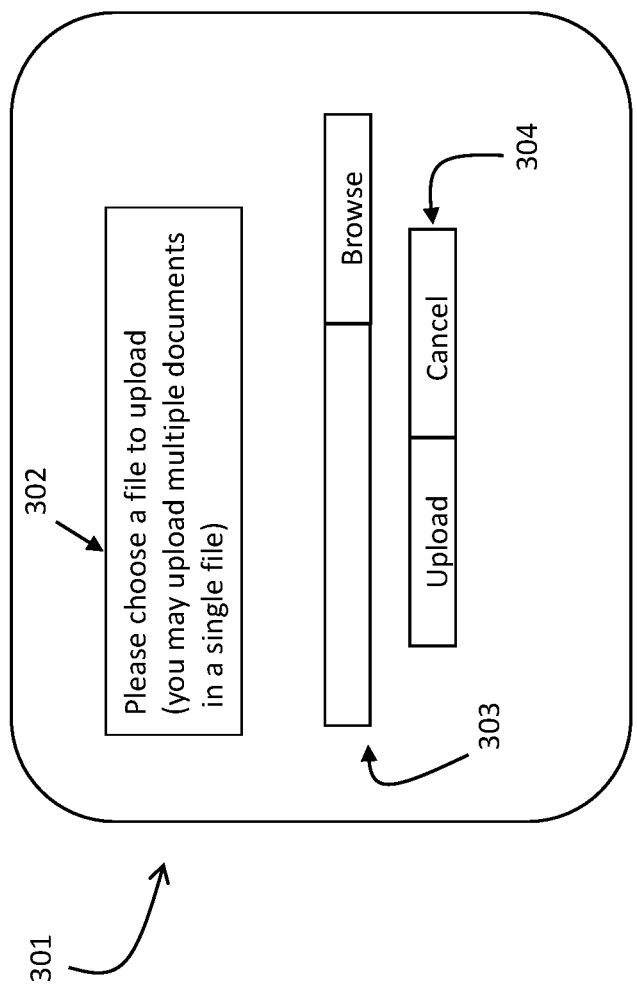
FIG. 3 illustrates another example user interface for a benefits application workflow.

FIG. 3 illustrates an example user interface 301 that is provided by an embodiment following a user selection of an upload documents selection option 203 in user interface 201. Here, the user interface 301 prompts the user to select a relevant file, e.g., an image or PDF file containing one or more relevant asset documents. The interface 301 includes a message 302 indicating that the user is to choose a file and notes that, in this example, a user may upload more than one document in a single file, e.g., a collection of bank statements, an insurance policy document, etc. The user interface 301 includes a file selection element 303 and an upload/cancel element 304.

Figure 4:
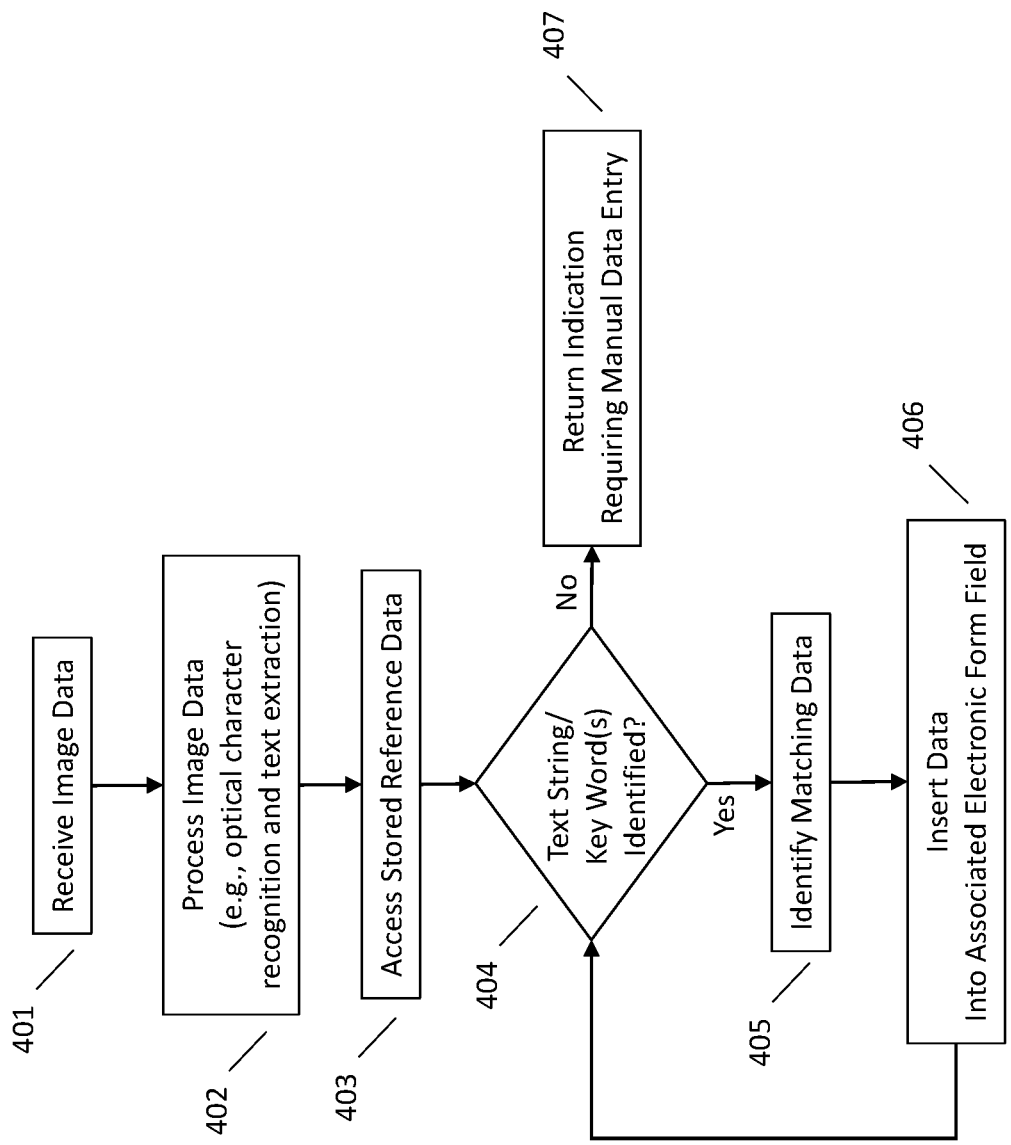
FIG. 4 illustrates an example method of a benefits application workflow.

After the user uploads a file, an embodiment may conduct image processing or other processing (e.g., based on the file type encountered, such as an image document, a document containing text, etc.) in order to process the file data and assist the user in completing the benefits application. For example, as illustrated in FIG. 4, an embodiment receives image data (e.g., a scanned PDF image document of an insurance policy), as indicated at 401. The image data is processed at 402, e.g., performing optical character recognition and text extraction, conducting pixel analysis and pattern analysis, conducting image analysis and comparison to a template or reference data, or a combination of the foregoing. This image data processed at 402 is compared with stored reference data at 403 in order to determine if there is identifiable data contained within the image data, e.g., as indicated at 404.

In a non-limiting example, if OCR and text extraction is used, the extracted text may be compared to an expected text string, e.g., for an insurance policy, bank statement, etc. By way of specific example, if the text extracted from the image data is "Example Life Insurance Company," and this same text string (or variant thereof) is contained in a reference store, a match may be determined at 404. Multiple documents may be identified in the same file and segmented. If no such match is found, even with low confidence, an embodiment may return an indication at 407 that manual input is required, e.g., a query to ask the user which type of document was uploaded, etc.

However, if a match is identified, the matching data is identified at 404. This identification of matching data at 404 may be presented to the user or occur in a transparent fashion. For example, a user may be presented with an indication or display of the matching data, e.g., "Example Life Insurance Company," or this identification may simply be internally stored in memory for subsequent use. By way of example, the identified matching data may be inserted automatically into a known field, e.g., the first available field in 103a of part 101 of the benefits application shown in FIG. 1. As another example, the identified data may be stored and subsequently utilized to insert the data (or part thereof) into a supplemental document file, e.g., automatically attaching the entire uploaded document or file to the benefits application for printing and submission.

Figure 5:
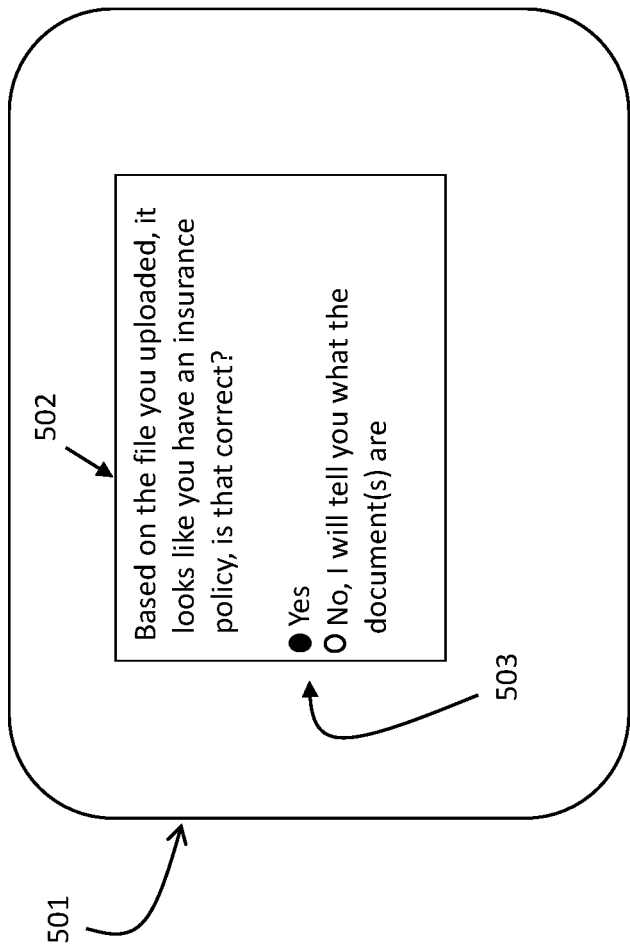
FIG. 5 illustrates another example user interface for a benefits application workflow.

Further, the identified data may be stored in and later retrieved from memory to implement a rule from a rule set. For example, and referring to FIG. 5, the identified data of the example in FIG. 4 may be used to trigger a rule providing an interface 501 to the user for confirmation of a document type identification. By way of specific example, if extracted data is "Example Life Insurance Company" and this data is matched to a known life insurance company in a reference data store, an embodiment may prompt a user to confirm an automated decision that the uploaded file contains an insurance policy, as indicated in message 502. The user is provided with selection options 503, as indicated. This permits an embodiment to automatically categorize document type(s) and provides the user with a confirmation process in order to facilitate use of the document type(s) in completing the benefits application, e.g., using data contained in the document(s) in a certain area or an application part. For example, the life insurance category of document part 101 of FIG. 1 may be automatically populated with a known life insurance company's name, the document may be stored in memory for inclusion in an appendix at the end of the benefits application for printing, a warning may be triggered and an indication provided to the user that, based on the document type being "insurance policy," and considering that data fields 103a of FIG. 1 are empty and/or element 102a is ticked, required insurance policy data may be missing from a particular part of the benefits application, e.g., the life insurance category "D" of document part 101, etc.

Figure 6:
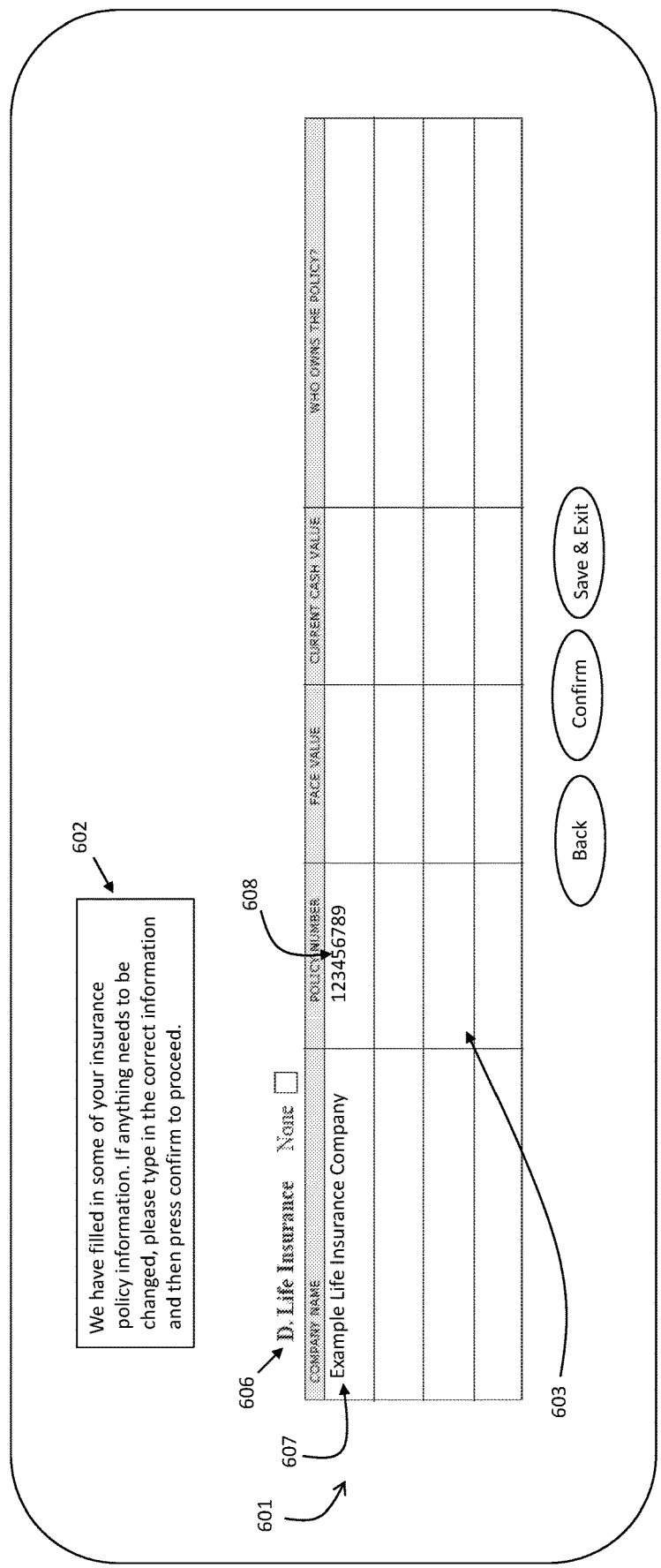
FIG. 6 illustrates another example user interface for a benefits application workflow.

By way of specific example, and referring to FIG. 6, an embodiment automatically categorizes a document type and uses data of the document to automate completion of the benefits application. In the example of FIG. 6, an embodiment extracts data from a document that the user uploaded and inserts it into an appropriate form field of the benefits application workflow. As a specific example, an embodiment performs OCR to extract text from the document. This text may be placed into a temporary location or memory space and processed, e.g., to remove whitespaces, to identify word boundaries, etc. Having processed the extracted text, an embodiment initially searches for a key word or words, e.g., known life insurance company names. This initial searching may be influenced by a variety of factors, e.g., in which part or at which time the user supplied data was received. For example, a user uploading documents in response to the user interface 301 illustrated in FIG. 3 may be searched against a predetermined set of key words or phrases. Thereafter, if a match (within a predetermined tolerance) is identified, an embodiment categorizes the OCR data as of a particular type, e.g., a life insurance policy, a bank statement, a title to an automobile, etc. An embodiment may then employ predetermined templates, e.g., a reference template indicating where within the life insurance company's policies certain data is contained and/or a data format of relevant data used by the life insurance company in question.

By way of specific example, data may be stored as reference data indicating that Example Life Insurance Company in particular uses a nine-digit policy number or includes a certain leading character string ahead of the policy number. Thus, any nine-digit number or leading character string followed by a number in an OCR text string may be extracted and inserted into an application part as a policy number for an Example Life Insurance Company policy. For example, illustrated in FIG. 6 is a message 602 indicating to a user that certain information has been automatically imported into the application part 601, e.g., using data processed from an image uploaded at 401 of FIG. 4. In the example of FIG. 6, within the category "D. Life Insurance" 606 of the application part 601, the data fields (generally indicated at 603) have been automatically populated with data entries 607, 608. As may be appreciated, other data fields, e.g., those associated with "Face Value," "Current Cash Value" and "Who Owns the Policy?" may be automatically populated in some cases. By way of specific example, depending on the type of image or file processing conducted, e.g., at steps 402-405 of FIG. 4, more or different data might be extracted, identified, and utilized in application part automated processing.

In certain cases, e.g., for particular banks, predetermined, common documents such as monthly bank statements may be produced to generate an extraction model. For example, a particular bank's monthly statement may contain certain structural elements, e.g., columns, rows, graphics, etc., that can be identified in an automated fashion via an image analysis or computer vision technique. This data can assist in identifying the document itself, as well as assist in identifying the location of other data. By way of example, a particular institution may place the account owner's name proximate to an image or logo within a bank statement. Thus, image analysis may use this repeated image or logo feature as a watermark to identify the document as of that particular bank, and may further utilize this image or logo feature location as a landmark for identifying a sub-part of the document for further processing, e.g., via optical character recognition, and for creation of a link or association between that extracted text data and a corresponding sub part or field in a benefits application form, e.g., bank account owner's name field (refer back to FIG. 1).

Figure 7:
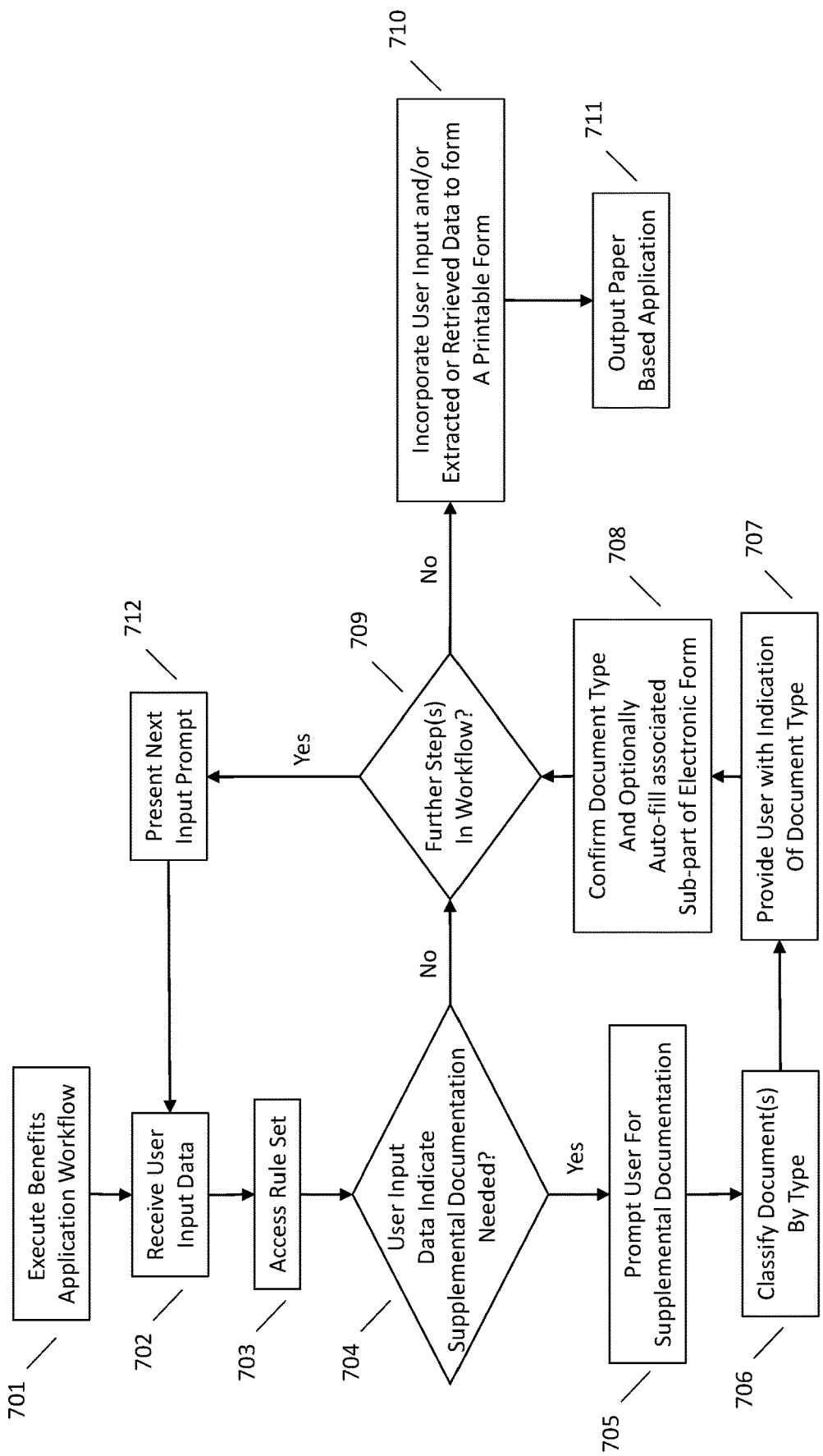
FIG. 7 illustrates an example method of a benefits application workflow.

Referring now to FIG. 7, an embodiment facilitates the completion of a benefits application in paper form by utilizing a computer implemented benefits application workflow. In the example of FIG. 7, the benefits application workflow is executed at 701, e.g., by loading a program of executable code for execution by a processor of a computing device. Thereafter, user input may be received, e.g., in response to a query, such as that illustrated by way of example in FIG. 2, noting that this is a non-limiting example.

Given the user input, a rule set may be accessed, e.g., a rule set that contains a rule to variably respond to the user's input provided via input selections 203. For example, as discussed, a rule may implement an action of loading a graphic, such as that illustrated by way of example in FIG. 3, for uploading user supplied documentation. Thus, the rule is analyzed on the basis of the received user input, as illustrated at 704 of FIG. 7. Here, the example rule is evaluated to determine if supplemental documentation is needed in order to fill out a part of the benefits application. By way of specific example, if a user input indicates that the user owns his or her home, supporting documentation will need to be supplied. If no such documentation is needed, a further step or steps in the workflow may be conducted, if any, as illustrated at 709. However, if supplemental or supporting documentation is needed, e.g., as for example dictated by a user input via an interface such as that illustrated in FIG. 2, the user may be prompted for input of data, e.g., taking a picture of a document, uploading of one or more files via an interface such as that illustrated in FIG. 3, etc., as illustrated at 705.

As described herein, the user may provide a file that is thereafter processed, e.g., for classification by type, as indicated at 706. By way of non-limiting example, a company name, graphic or other data may be extracted from an image or text based file to determine that the document is likely of a particular type as part of the classification of 706. As a specific example, an identical or partial match of a company name or image/graphic might be used to identify a stored company name or image/graphic as part of the classification conducted at 706. If such reference data is identified, a user may be provided with an indication of document type, if any, at 707. This type classification may be confirmed at 708, e.g., via user input. Further, an embodiment may optionally auto-fill the appropriate part or sub-part (e.g., electronic form field associated with that document type) based on the classification. It is noted that this auto-fill feature may include simply adding the document to an appendix of the benefits application or may include extracting data from the document and auto-filling a predetermined field matched with that data type (e.g., account number, owner name, etc.). Likewise, predetermined data may be stored and inserted into the benefits application data entry field. By way of specific example, if a partial match is obtained based on image analysis for a given financial institution, the full name of that institution may be inserted for the user to confirm.

As stated, an embodiment may proceed to provide further questions or queries to the user as part of the benefits application workflow, indicated again at 709. For example, an embodiment may progress to a next step in the workflow by prompting the user at 712 for further input, i.e., to assist the user in providing data in electronic form for completing the benefits application.

If no more steps remain in the workflow, as determined at 709, an embodiment incorporates the user input and/or extracted or retrieved data to form a printable document at 710 to output a paper-based application at 711. As a specific example, throughout the benefits application workflow, the user may be presented with parts or sub-parts of a benefits application via use of a display screen. However, the displayed parts or sub-parts may not be the actual benefits application (e.g., fillable PDF document, if available from a state or federal agency). Rather, these may be graphics generated to mimic or appear similar to the part or sub-part of the benefits application in question. Thus, the user input data and/or the extracted or retrieved data is incorporated in to a simulated, electronic version of the benefits application part or sub-part. This simulated, electronic version of the benefits application part or sub-part is a graphic that is later used to compile or form a completed electronic document at 710 that may be printed as the paper benefits application at 711. This electronic document may or may not be a predetermined, state or federally issued form populated with the user's data. That is, an embodiment may produce an equivalent electronic document for printing in place of the state or federally issued printable form and/or an embodiment may import user data into a predetermined state or federal form.

As an example, the simulated, electronic version of the part 601 illustrated in FIG. 6 may be a graphic produced by an embodiment to mimic an actual benefits application form, and used to provide the user with a visual cue of what data has been automatically extracted and filled in for a particular part of the benefits application, as opposed to a view of the actual state or federally issued printable form. Further, one or more of the fields 603 may allow a user to add, correct, delete or modify the data entries, e.g., data entries 607, 608. While part of this displayed data, e.g., part 601 and its attendant column values, header, etc., may not be used for import into an electronic benefits application document suitable for printing, the data entries 607, 608 may be so used. Thus, an embodiment may take data entries 607, 608, e.g., which are separately buffered in memory, and import these into appropriate fields of an electronic benefits application document issued from a state or federal agency that is suitable for printing. This processing of the data entries may occur through a data importation process, e.g., such as via importing data entries into specific, predetermined fields of a PDF document or like processing. This processing of the data entries may occur at various times, e.g., data entries such as illustrated at 607, 608 may be periodically or intermittently imported into an electronic benefits application document that is updated and saved in persistent memory, e.g., so that a user may save an exit the benefits application workflow and resume the process at a later time. Moreover, if periodic or intermittent importation of data entries into the electronic benefits application document is performed, a user may preview the up-to-date, partially completed form of the electronic benefits application document that will ultimately be printed as the paper application at 711.

As described herein, an embodiment may access various rule sets comprising one or more rules to process user input data and/or extracted or retrieved data. Such rules may include rules for extracting data, e.g., from image files, text files, etc., and/or rules for processing identified data, e.g., as input by a user, as extracted from an image file, etc. By way of example, an embodiment may implement a rule to identify particular user input data, e.g., an indication that a particular document is owned by an applicant's spouse, rather than by the applicant, and use this to change a prior determination regarding extracted data, e.g., a determination that an asset value (or part thereof) is attributable to the applicant. For example, a user input may attribute to a spouse a document that has been identified by an embodiment as an IRA document type, with a certain extracted account value. Thus, an embodiment may implement or trigger a rule to include the listed document in the application, include the listed account value, but discount this value as part of a projection of benefits eligibility. Other examples are of course possible, e.g., projecting an amount that a spouse may keep according to governing rules or laws, etc.

An embodiment may further provide useful linkages between data, e.g., data values, documents, etc. This facilitates providing the user with interfaces for easily tracking and confirming or correcting certain entries made within the benefits application. By way of example, in certain benefits documents, codes are utilized rather than readily understandable names. For example, a numeric code may be used rather than an account type, e.g., "001" may be a code required by a benefits application, rather than a simple name such as "checking." If multiple entries use the same code (e.g., the applicant has more than one checking account), and supporting documentation is to be appended for each entry, auditing and/or correcting the benefits application data entries can be particularly cumbersome, as it will not be readily apparent which checking account belongs to which account balance and supporting documentation.

An embodiment therefore creates a link or association between certain data entries and documents within the workflow. By way of specific example, and referring back to FIG. 1, for each bank account (e.g., if an applicant has multiple checking accounts), the data entry for "account type" may be numeric (e.g., 001 rather than "checking" as indicated). Thus, a user may have multiple entries of "001" in the second column of the category "F. Bank Accounts (Checking, Savings, IRA, etc.)" and this may add confusion if the user wishes to confirm a value, e.g., current balance. Thus, an embodiment creates a link, which may include a visual indication (illustrated by visual highlighting and bounding box in the example of FIG. 1) between the numeric code entry, e.g., "001" and the supporting document for which it belongs. Thus, even when two or more of the same numeric codes appear, a user may simply click on (or otherwise interface with, e.g., touch in the case of a touch screen) the numeric code and be taken to an electronic copy of the corresponding document or summary data for the corresponding document. This permits a user to quickly identify where the data entry in the current view (e.g., of FIG. 1) was obtained.

An embodiment may include other rules. For example, an embodiment may include rules that automatically prompt a user to fill out certain portions of the benefits application, and not others, depending on certain inputs or available data. By way of example, an embodiment that processes an uploaded file and determines that an insurance policy has been uploaded (with or without user confirmation), may prompt or direct a user to fill out a life insurance policy portion of the benefits application workflow, e.g., part "D" of FIG. 1.

An embodiment may include rules that assist the user in determining the completeness of the benefits application prior to proceeding to print the paper-based application. By way of specific example, a user may be prompted to upload or identify additional account statements as supporting documentation if one or more manually keyed entries within the benefits application workflow are not linked to a supporting document, e.g., as indicated by a lack of visual highlighting for that data entry or use of a different color (e.g., red) to indicate a missing document. In such a case, a user interfacing with that data entry might be shown a message, e.g., "a supporting document is needed," rather than being taken to an electronic copy of the corresponding document or summary data of the corresponding document.

An embodiment may include other helpful rules regarding benefits-specific tasks that must be completed. For example, Medicaid requires updated information when assets are closed. An embodiment therefore may automatically calculate the next Medicaid renewal time, and determine that an asset is deemed closed and no longer needs to be reported. However, supplemental documentation needs to be given in that year proving it was closed. Thus, an embodiment may implement an automated asset closing calculation, and track the asset closure(s) to provide the user with indications that an asset is or is not closed, and does or does not require supporting documentation. In this regard, prior versions (e.g., from past years, etc.) of a particular applicant's benefits application(s) may be stored and accessed by an embodiment to facilitate such updated determinations.

Figure 8:
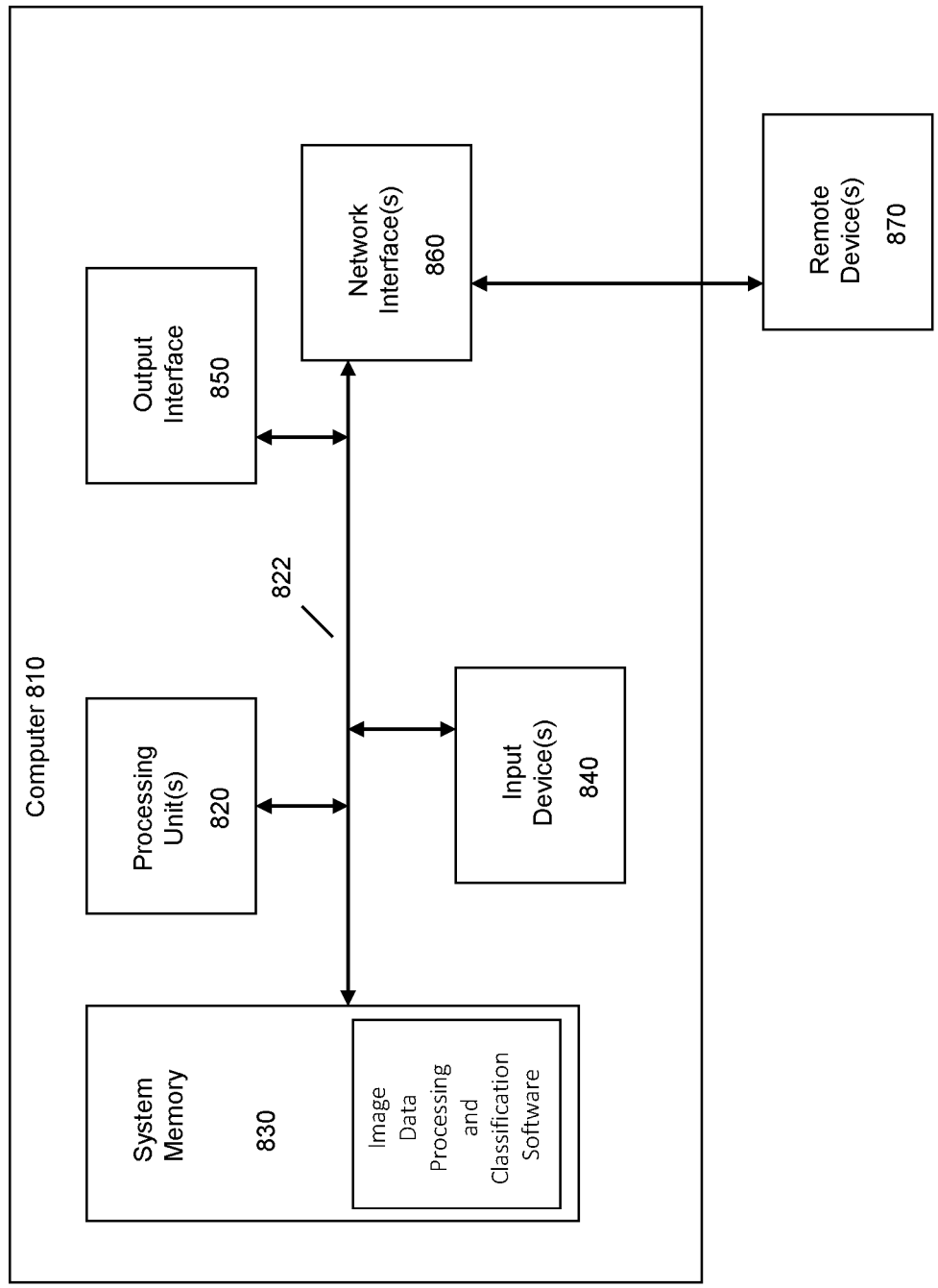
FIG. 8 illustrates an example computer device.

It will be readily understood that certain embodiments can be implemented using any of a wide variety of devices or combinations of devices. Referring to FIG. 8, an example device that may be used in implementing one or more embodiments includes a computing device (computer) 810.

The computer 810 may execute program instructions or code configured to store and analyze data and perform other functionality of the embodiments, as described herein. Components of computer 810 may include, but are not limited to, a processing unit 820, a system memory 830, and a system bus 822 that couples various system components including the system memory 830 to the processing unit 820. The computer 810 may include or have access to a variety of non-transitory computer readable media. The system memory 830 may include non-transitory computer readable storage media in the form of volatile and/or nonvolatile memory devices such as read only memory (ROM) and/or random-access memory (RAM). By way of example, and not limitation, system memory 830 may also include an operating system, application programs, other program modules, and program data. For example, system memory 830 may include application programs such as image processing and data extraction software and/or document classification software. Data may be transmitted by wired or wireless communication, e.g., from computer 810 to another computing device.

A user can interface with (for example, enter data and information) the computer 810 through input devices such as a touch screen, mouse, stylus, etc. A monitor or other type of display screen or device can also be connected to the system bus 822 via an interface, such as an interface 850. The computer 810 may operate in a networked or distributed environment using logical connections to one or more other remote computers or databases. The logical connections may include a network, such local area network (LAN) or a wide area network (WAN), but may also include other networks/buses.

It should be noted that the various functions described herein may be implemented using processor executable instructions stored on a non-transitory storage medium or device. A non-transitory storage device may be, for example, an electronic, electromagnetic, or semiconductor system, apparatus, or device, or any suitable combination of the foregoing. More specific examples of a non-transitory storage medium include the following: a portable computer diskette, a hard disk, a random-access memory (RAM), a read-only memory (ROM), an erasable programmable read-only memory (EPROM or Flash memory), a portable compact disc read-only memory (CD-ROM), a solid-state memory, or any suitable combination of the foregoing. In the context of this document "non-transitory" includes all media except non-statutory signal media.

Program code embodied on a non-transitory storage medium may be transmitted using any appropriate medium, including but not limited to wireless, wireline, optical fiber cable, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected by one skilled in the art without departing from the scope or spirit of the disclosure.

What is claimed is:

1. A method, comprising:
    executing a benefits application workflow for simulating a paper-based benefits application using a first computing device, comprising:
    receiving first documentation of an applicant;
    providing data for displaying, on a device screen, a graphical representation of a paper-based benefits application that includes one or more fields associated with a rule;
    automatically inserting, using a processor, data of the first documentation into at least one of the one or more fields;
    receiving, from an input device, a user input comprising text or numeric input to the one or more fields;
    based on the user input to the one or more fields, providing, using a processor, a request for supporting documentation, wherein the request identifies that a supporting document is required to be submitted as part of the paper-based benefits application;
    thereafter receiving, over a communication link, user supplied documentation of the applicant;
    classifying the user supplied documentation, using a processor, by: processing the user supplied documentation to identify one or more elements thereof; comparing the one or more elements to a datastore of known elements; and determining a document type based on the comparing;
    providing data to an output device comprising an indication of the document type and a request for user confirmation thereof;
    thereafter confirming the document type and automatically associating a document of the confirmed document type with a field associated with the user input;
    wherein the document type is a spousal individual retirement account (IRA) document;
    providing, using a processor and based on at least in part on the spousal IRA document, an initial eligibility indication based on assigning the IRA document a spousal amount and excluding the spousal amount from assets of the applicant; and thereafter converting user supplied data to the one or more fields into a printable form of the paper-based benefits application, including the document of the user supplied documentation wherein the first computing device is not configured to submit the paper-based benefits application to one or more online application portals utilized to process online applications.

2. The method of claim 1, further comprising loading a data extraction model based on the document type; and extracting data from the image using the data extraction model.

3. The method of claim 2, comprising automatically inserting the extracted data into the graphical representation of a paper-based benefits application.

4. The method of claim 1, wherein one or more of the first documentation and the user supplied documentation comprises a plurality of documents.

5. The method of claim 4, comprising segmenting the plurality of documents and providing a link to view a corresponding one of the plurality of documents.

6. The method of claim 1, comprising providing, over a network, the printable form of the paper-based benefits application.

7. A system comprising:
a processor; and
a memory device operatively coupled to the processor;
the memory comprising code executable by the processor for simulating a paper-based benefits application, the code comprising:
code that executes a benefits application workflow, comprising:
code that receives first documentation of an applicant;
code that provides data for displaying, on a device screen of a computing device, a graphical representation of a paper-based benefits application that includes one or more fields associated with a rule;
code that automatically inserts data of the first documentation into at least one of the one or more fields;
code that receives a user input comprising text or numeric input to the one or more fields;
code that provides, based on the user input to the one or more fields, a request for supporting documentation, wherein the request identifies that a supporting document is required to be submitted as part of the paper-based benefits application;
code that thereafter receives user supplied documentation;
code that classifies the user supplied documentation, using the processor of the system, by: processing the user supplied documentation to identify one or more elements thereof; comparing the one or more elements to a datastore of known elements; and determining a document type based on the comparing;
code that provides an indication of the document type and a request for user confirmation thereof;
code that thereafter confirms the document type and automatically associates a document of the confirmed document type with a field associated with the user input;
wherein the document type is a spousal individual retirement account (IRA) document;
code that provides, based on at least in part on the spousal IRA document, an initial eligibility indication based on assigning the IRA document a spousal amount and excluding the spousal amount from assets of the applicant; and code that thereafter converts user supplied data to the one or more fields into a printable form of the paper-based benefits application, including the document of the user supplied documentation;

wherein the code for simulating the paper-based benefits application is not configured to submit the paper-based benefits application to one or more online application portals utilized to process online applications.

8. The system of claim 7, further comprising code that loads a data extraction model based on the document type; and code that extracts data from the image using the data extraction model.

9. The system of claim 8, comprising code that automatically inserts the extracted data into the graphical representation of a paper-based benefits application.

10. The system of claim 7, wherein one or more of the first documentation and the user supplied documentation comprises a plurality of documents.

11. The system of claim 10, comprising code that segments the plurality of documents and code that provides a link to view a corresponding one of the plurality of documents.

12. The method of claim 1, comprising
determining that the user input relates to an asset closure; and
automatically determining, using a processor, a required supporting document type for the asset closure;
wherein the request for supporting documentation comprises a request for the required supporting document type for the asset closure.

13. The method of claim 1, comprising providing an indication that a supporting document is missing for a particular field of the one or more fields.

14. The method of claim 13, wherein the indication comprises highlighting displayed on the display screen.

15. A method, comprising:
using a client computing device for simulating a paper-based benefits application, the client computing device being configured for:
displaying, on a display device, at least a portion of a benefits application that mimics a paper benefits application, the at least a portion of the benefits application comprising data fields for entering alphanumeric applicant data;
receiving documentation of the applicant;
automatically populating, using a processor, one or more data fields using data of the documentation;
receiving user input to one or more data fields;
displaying, on the display device, an indication that supporting documentation is required based on the user input;
thereafter receiving the supporting documentation, extracting data therefrom, incorporating data of the supporting documentation into the one or more data fields, and appending the supporting documentation to the benefits application;
determining an initial eligibility status for the applicant based on the data of the one or more data fields and the supporting documentation;
the determining comprising automatically identifying that the supporting documentation includes a spousal asset and discounting the spousal asset from an asset value of the applicant;

thereafter outputting a data file to print the benefits application and supporting documentation, wherein the client computing device is not configured to submit the paper-based benefits application to one or more online application portals utilized to process online applications.

\* \* \* \* \*